(12) United States Patent
Jewell et al.

(10) Patent No.: US 9,122,602 B1
(45) Date of Patent: Sep. 1, 2015

(54) ROOT CAUSE DETECTION SERVICE

(75) Inventors: Gavin R. Jewell, Seattle, WA (US); Luke F. Kearney, Navan (IE)

(73) Assignee: Amazon Technologies, Inc., Seattle, WA (US)

( * ) Notice: Subject to any disclaimer, the term of this patent is extended or adjusted under 35 U.S.C. 154(b) by 1036 days.

(21) Appl. No.: 13/223,061

(22) Filed: Aug. 31, 2011

(51) Int. Cl.
G06F 11/00 (2006.01)
G06F 11/07 (2006.01)

(52) U.S. Cl.
CPC .......... *G06F 11/079* (2013.01); *G06F 11/0784* (2013.01)

(58) Field of Classification Search
CPC ............................ G06F 11/0784; G06F 11/079
See application file for complete search history.

(56) References Cited

U.S. PATENT DOCUMENTS

| | | | |
|---|---|---|---|
| 6,651,183 B1 * | 11/2003 | Gensler et al. | 714/4.3 |
| 7,296,194 B1 * | 11/2007 | Lovy et al. | 714/57 |
| 8,156,378 B1 * | 4/2012 | Suit | 714/26 |
| 2004/0049565 A1 * | 3/2004 | Keller et al. | 709/223 |
| 2005/0015668 A1 * | 1/2005 | Doyle et al. | 714/25 |
| 2005/0091640 A1 * | 4/2005 | McCollum et al. | 717/117 |
| 2009/0055684 A1 * | 2/2009 | Jamjoom et al. | 714/26 |
| 2009/0313508 A1 * | 12/2009 | Yan et al. | 714/47 |
| 2011/0154097 A1 * | 6/2011 | Barlow et al. | 714/3 |
| 2012/0030346 A1 * | 2/2012 | Fukuda et al. | 709/224 |
| 2012/0054331 A1 * | 3/2012 | Dagan | 709/224 |
| 2012/0054554 A1 * | 3/2012 | Dagan | 714/39 |
| 2012/0173927 A1 * | 7/2012 | Rymeski et al. | 714/26 |
| 2012/0185735 A1 * | 7/2012 | Sambamurthy et al. | 714/47.1 |
| 2012/0185736 A1 * | 7/2012 | Sambamurthy et al. | 714/47.3 |

* cited by examiner

*Primary Examiner* — Joshua P Lottich
(74) *Attorney, Agent, or Firm* — Knobbe, Martens, Olson & Bear, LLP

(57) ABSTRACT

Systems and methods are provided for mapping dependencies between system components and for analyzing and acting on possible root causes for anomalies experienced by the system components. Aspects of the present disclosure may present for display information associated with the dependency maps and ranked lists of possible root causes of anomalies. Ranking comprises determination of which operating parameters of related system components, when anomalous, will have the greatest effect on the operation of monitored system components. When possible root causes are ranked, notifications may be issued to alert administrators or other systems of the anomaly and the likely root causes.

28 Claims, 5 Drawing Sheets

ROOT CAUSE DETECTION SERVICE

BACKGROUND

Computer systems are often designed with tens, hundreds, or even thousands of separate components in order to realize the benefits of modularity. However, such systems can have an equally large number of potential points of failure. As the number of components in a system increases, it becomes more important to map the relationships between them in order to be able to quickly determine the root cause of an anomaly. Accurate dependency maps and methods to pinpoint the most likely root cause of an anomaly are important because, in many cases, a significant portion of a company's mission involves the reliable operation of such systems. For example, electronic network retailers and content providers can derive a substantial portion of their revenue from the sales and advertising facilitated by their computer systems, and any downtime can have a negative effect on customer traffic.

In many cases, anomalies experienced by one system component can affect the actions of another system component. In such cases, the two system components are related, and the second system component depends upon the first system component to execute properly. One problem, among others, is that such dependency relationships between the many separate system components can be difficult to map. In large-scale modern systems which undergo regular maintenance and upgrades, a dependency map must be updated each time a system component is added to, modified, or removed from the system. Without an accurate method to map the dependency relationships between the many system components, it can be difficult to determine the root cause of an anomaly experienced by one of the system components. Moreover, the number of system components that can have an effect on the operation of said system component can make it difficult to determine the root cause of an anomaly because there can be a large number of possible root causes.

Some system administrators utilize dependency maps that require them to specify the relationships between system components. Other system administrators utilize monitoring systems that require them to specify the various ways in which an anomaly in one system component can be a root cause of an anomaly in another system component. System administrators who configure these monitoring systems may determine the settings based on information from system developers who may not have a complete picture of how the various system components interact, or their own anecdotal evidence regarding which anomalies of system components may have the most substantial effect on related system components, or on recommendations from other system administrators whose systems may be operating in an entirely different environment.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to providing administrators of computer systems having interrelated and dependent system components—including hardware components such as servers, desktop computers, mobile computing devices, etc., and software components, such as computer-executable programs, operating systems, web services, etc.—with a tool for troubleshooting anomalous behavior in a monitored system component. Specifically, aspects of the disclosure will be described with regard to mapping dependencies between various system components. The dependency maps can be used to determine which system components may be experiencing an anomaly that is a possible root cause of the anomaly experienced by a monitored system component. The determination can be based on the activity of the system components upon which a monitored system component depends. Various user interfaces will be described that enable users, such as system administrators, to view the dependency maps and possible root cause anomalies, and to configure the operation of the analysis modules that act on those dependency maps and possible root cause anomalies. Although various aspects of the disclosure will be described with regard to illustrative examples and embodiments, one skilled in the art will appreciate that the disclosed embodiments and examples should not be construed as limiting.

Figure 1:
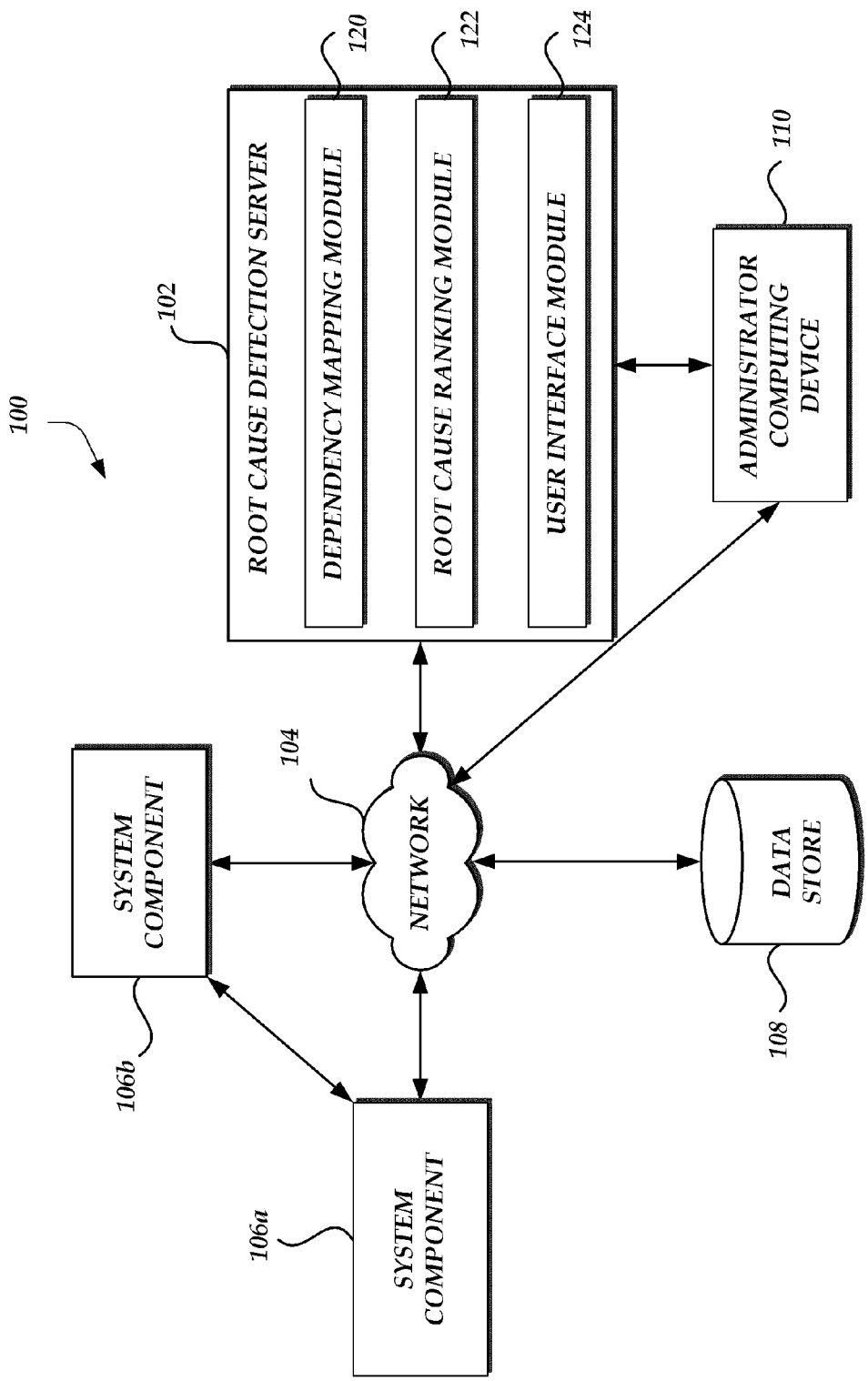
FIG. 1 is a schematic block diagram depicting an illustrative operating environment including a plurality of system components and a root cause detection server for determining possible root causes of anomalies in monitored system components.

FIG. 1 presents an illustrative system 100 with a root cause detection server 100 according to the present disclosure. The system 100 is depicted in FIG. 1 as operating in a distributed computer environment comprising several computer systems that are interconnected using one or more computer networks. The system 100 could also operate within a computer system having a fewer or greater number of components than are illustrated in FIG. 1. In addition, the operating environment 100 could include various web services and/or peer-to-peer network configurations. Thus, the depiction of system 100 in FIG. 1 should be taken as illustrative and not limiting to the present disclosure. The system 100 comprises at least two system components 106, a network 104, a root cause detection server 102, a data store 108, and an administrator computing device 110. In the illustrated embodiment the root cause detection server 102 executes at least a dependency mapping module 120, a root cause ranking module 122, and a user interface module 124 described in more detail below. The root cause detection server 102 may communicate with the system components 106 and data store 108 over the network 104. Although the root cause detection server 102 is depicted in FIG. 1 as communicating with the data store 108 over network 106, the data store 108 can alternatively be located on the same physical device as the root cause detection server 102 or, in direct communication with the root cause detection server 102. Moreover, data store 108 can include one or more data stores physically or logically related to each other, or can be implemented as a web service itself.

Those skilled in the art will recognize that a system component 106 can be any of a number of computing devices that are capable of communicating over a network, including, but not limited to a server, a laptop, personal computer, personal digital assistant (PDA), hybrid PDA/mobile phone, mobile phone, electronic book reader, digital media player, tablet, and the like. Alternatively, a system component 106 can be a computer executable program, or parts thereof, running on one or more computing devices. Such computer-executable programs can include operating systems, distributed programs, stand-alone computer programs, mobile applications, web services, and the like. In some embodiments, a system component 106 can be both an individual computing device and one or more executable programs running on the computing device. In yet other embodiments, a system component 106 is a combination of one or more computing devices and one or more computer-executable programs.

The network 104 can be any wired network, wireless network, or combination thereof. In addition, the network 104 may be a personal area network, local area network, wide area network, cable network, satellite network, cellular telephone network, etc. or combination thereof. In some embodiments, the network 104 is the internet.

The root cause detection server 102 can be configured with a computer executable program or a collection of such programs running on a single device or across a plurality of devices. The programs functioning as the dependency mapping module 120, root cause ranking module 122, and user interface module 124 can also be configured to run across a plurality of devices in a distributed computing environment. The configuration can change dynamically according to work load and other parameters. Alternatively, the dependency mapping module 120, root cause ranking module 122, and user interface module 124 can be separated and configured to run on separate devices or as separate modules within the same device. In any of these configurations, the dependency mapping module 120, root cause ranking module 122, and user interface module 124 can be configured to communicate with each other, either directly, through data stored in the data store 108, or through some intermediary.

In operation, one or more system components 106 can be configured to send anomaly data over a network 104 to the data store 108. The anomaly data can be a numerical measurement of an operating parameter that is outside the normal or expected range of measurements. For example, the operating parameter can be central processing unit (CPU) usage, network usage, hard drive free space, number of orders processed, number of requests received, latency, etc. The anomaly data can contain, in addition to the numerical measurement of an operating parameter, a timestamp representing the time that the measurement of the operating parameter was taken. The anomaly data can represent an anomaly that has occurred or is in the process of occurring in the system component 106. For example, the anomaly data can include a measurement of CPU usage that is outside an expected range for the time it is recorded. A system component 106 can notify the root cause detection server 102 directly when experiencing an anomaly. In some embodiments, the anomaly data can be sent to a separate system or computing device, such as an anomaly detection server, which determines whether the anomaly data represents an actual anomaly and then sends the data to the data store 108 where it can be stored as an anomaly record. Such an anomaly detection server can also issue notifications to the root cause detection server 102 when an anomaly is detected. One example of an anomaly detection server is described in commonly owned U.S. patent application Ser. No. 13/222,850 entitled "Anomaly Detection Service" filed Aug. 31, 2011, which is incorporated herein in its entirety by reference.

On demand, or on some predetermined, periodic or a periodic, schedule, the root cause detection server 102 can invoke the dependency mapping module 120. Using the instructions of the dependency mapping module 120, the root cause detection server 102 can determine the dependency relationships between the system components 106, create dependency definitions based upon those dependency relationships, and store the dependency definitions in the data store 108, as described in detail below. Upon receipt of an anomaly notification from a monitored system component 106, the root cause detection server 102 can invoke the root cause ranking module 122, also described in detail below. Using the instructions of the root cause ranking module 122, the root cause detection server 102 can load anomaly records from the data store 108 and rank the anomaly records to determine which anomalies are the most likely root cause of the anomaly experienced by the monitored system component 106. An administrator computing device 110 can request to view information regarding the activities of the root cause detection server 102 and its analysis of the anomaly records. Upon receipt of the request, the root cause detection server 102 can invoke the user interface module 124 and load data from the data store 108 to generate a user interface for the presentation at the administrator computing device 110. The user interface can include information regarding the ranking of the anomaly records, information regarding the mapping of the dependencies between system components 106, and it can also include interactive controls for further configuring the operation of the root cause detection server 102.

Figure 2:
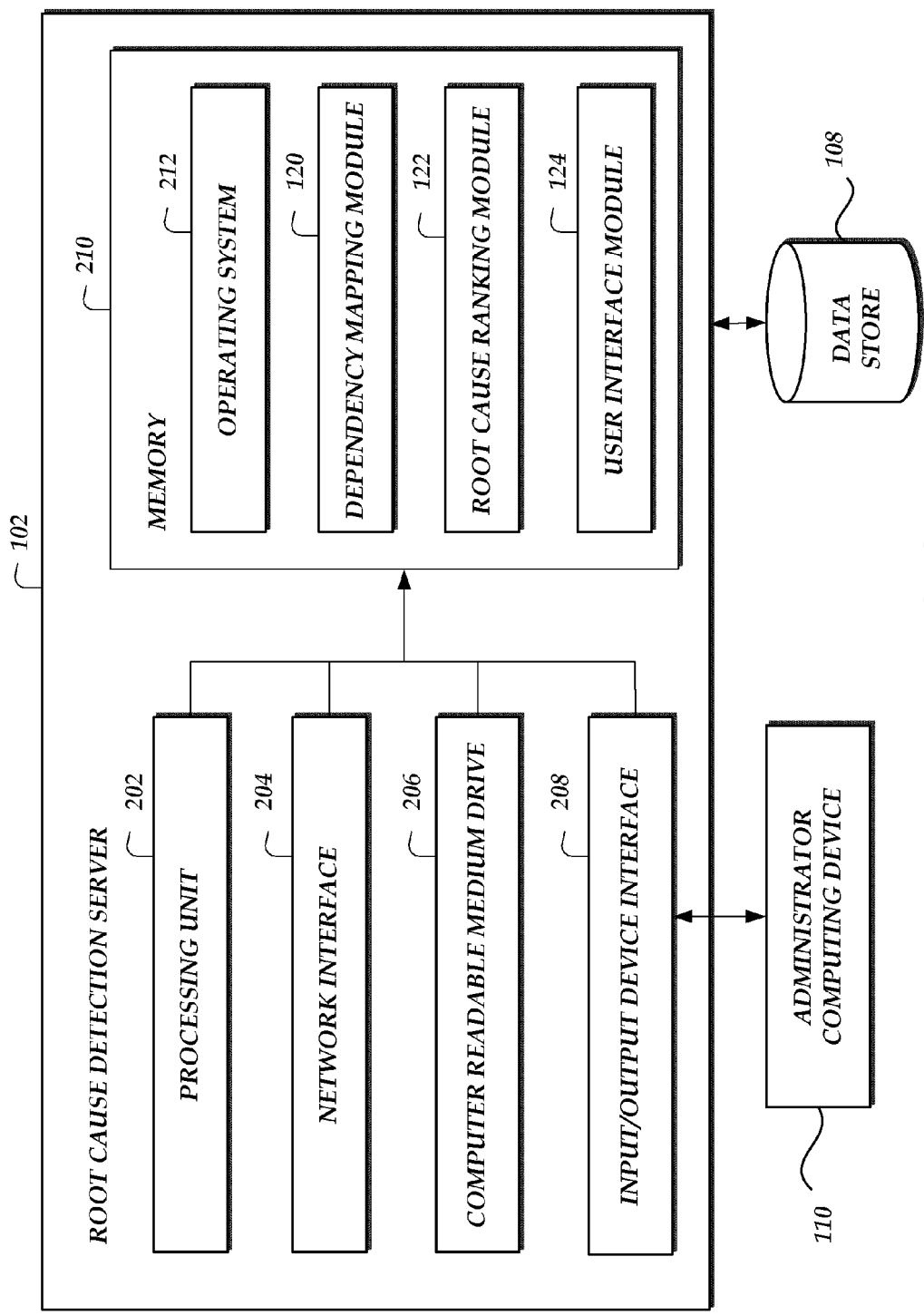
FIG. 2 depicts an illustrative general architecture of a root cause detection server, including at least a dependency mapping module for determining dependency relationships between system components, a root cause ranking module for determining possible root causes of anomalies in the system components, and a user interface module for generating a user interface for presenting information generated by the dependency mapping module and root cause ranking module.

Referring now to FIG. 2, one embodiment of a root cause detection server 102 is illustrated in more detail. The root cause detection server 102 can be a server or other computing device, and can include, but not be limited to, a processing unit 202, a network interface 204, a computer readable medium drive 206, an input/output device interface 208, and a memory 210. The network interface 204 can provide connectivity to one or more networks or computing systems. The processing unit 204 can receive information and instructions from other computing systems or services via the network interface 204. The network interface 204 can also store data directly memory to 210. The processing unit 202 can communicate to and from memory 210 and output information to an administrator computing device 110 via the input/output device interface 208. The input/output device interface 208 can also accept input from the administrator computing device 110.

The memory 210 contains computer program instructions that the processing unit 202 executes in order to implement one or more embodiments. The memory 210 generally includes RAM, ROM and/or other persistent or non-transitory memory. The memory 210 can store an operating system 212 that provides computer program instructions for use by the processing unit 202 in the general administration and operation of the root cause detection server 102. The memory 210 can further include computer program instructions and other information for implementing aspects of the present disclosure. For example, in one embodiment the memory 210 includes a user interface module 124 that generates user interfaces (and/or instructions therefor) for display upon a monitored computing device, e.g., via a navigation interface such as a web browser installed on the administrator computing device 110. In addition, memory 210 may include or communicate with one or more auxiliary data stores, such as data store 108. In addition to the user interface module 124, the memory 210 can include a dependency mapping module 120 and a root cause ranking module 122 that can each be executed by the processing unit 202.

In operation, the root cause detection server 102 can communicate with system components 106 over the network 104, as described above. The network interface 204 facilitates such communication for the root cause detection server 102. Based on the instructions of the dependency mapping module 120 and root cause ranking module 122 in memory 210, the processing unit 202 can load data from the data store 108 into memory 210, perform calculations on the input from the system components 106 and the data loaded into memory 210, store the resulting calculations in the data store 108, and perform one or more notification procedures.

Figure 3:
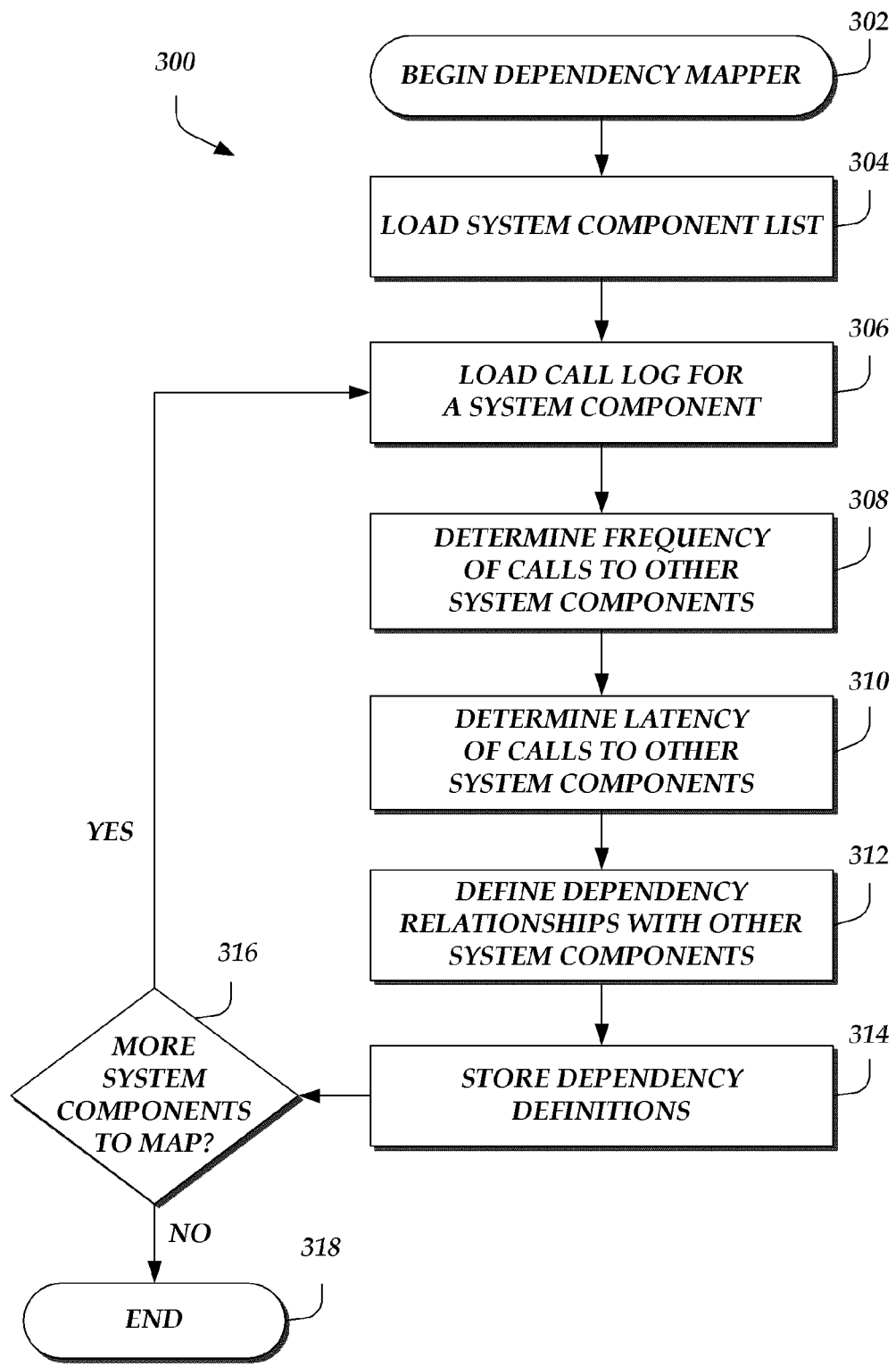
FIG. 3 is a flow diagram of an illustrative routine implemented by the dependency mapping module to determine dependency relationships between system components.

FIG. 3 is a flow diagram of an illustrative dependency mapper 300 implemented by the dependency mapping module 120 to determine and rank the relationships between system components 106 and to create dependency definitions based on those relationships. One skilled in the relevant art will appreciate that the dependency mapper 300 may be implemented by one or many computing devices or components that are associated with the dependency mapping module 120. The dependency mapper 300 is described with respect to determining the relationships between system components 106 based on logs of the interactions between the system components 106. However, the dependency mapper 300 can be implemented differently without departing from scope of the disclosure, and thus the following illustrative embodiments and examples should not be construed as limiting.

A dependency mapper 300 is often useful in determining the relationships between system components 106 based on their interactions with each other. For example, in a multi-component system that builds and delivers a user interface over a network, such as a web site, a first system component 106 may receive a request to view a resource, such as a web page. The first system component 106a can perform preprocessing actions to the request before passing the request to a second system component 106b which creates the user interface. The second system component 106b can then call—or request execution of—a third system component 106c (not shown) to load data for display. In such a system, the first system component 106b executes before the second system component 106b and affects the actions of the second system component 106b. The second system component 106b can be said to depend on the first system component 106a, and therefore the relationship between the two system components 106a and 106b is a dependency. The first system component 106a does not depend on the second component 106b, however, because the actions of the second system component 106b do not affect the operation of the first system component 106a. The second system component 106b initiates the execution of the third system component 106c and therefore affects the actions of the third system component 106c. Therefore, the third system component 106c is dependent on the second system component 106b. In addition, the third system component 106c affects the actions of the second system component 106b because the second system component 106b uses data loaded by the third system component 106c. Therefore, the second system component 106b depends on the third system component 106c. Because the actions of second system component 106b and third system component 106c directly affect each other, the two system components 106a and 106c are codependent on each other.

In another embodiment, a first system component 106a can begin execution before a second system component 106b without operating on the same data as the second system component 106b and without calling the second system component 106b. However, the first system component 106a consumes system and network resources, and overconsumption of such resources can have an effect on the operation of the second system component 106b. Therefore, the relationship between the two system components 106a and 106b is a dependency, because the actions of the first system component 106a can affect the actions of the second system component 106b. In some embodiments, the dependency mapper 300 can also rank the importance of each relationship, which can aid in determining and ranking possible root causes of an anomaly experienced in a monitored system component 106, as described below with respect to FIG. 4. For example, when the first component 106a does not directly communicate with the second component 106b, that attribute can be taken into consideration when determining the importance of the relationship. Such a lack of direct communication between the two system components 106a, 106b can indicate that the relationship is less likely to provide the root cause for an anomaly when compared to other relationships that are more important.

In some embodiments, a complex system may comprise tens, hundreds, or even thousands of system components 106. Many times, such a complex system will include a logging feature, wherein each system component 106 logs its actions, such as each additional system component 106 that it calls or passes data to, and the like.

In operation, the dependency mapper 300 illustrated in FIG. 3 begins at block 302. The dependency mapper 300 can be initiated by a system administrator to create dependency definitions in a complex system. In some embodiments, the dependency mapper 300 can be automatically initiated on a regular schedule, or in response to an event, such as the addition of a new system component 106 to the system.

Dependency mapper 300 then proceeds to block 304, where the dependency mapping module 120 loads a list of the system components 106. The list of system components 106 can be loaded from a data store 108, memory 210, received from a web service, manually loaded etc. In some embodiments, the list of system components 106 can be created by the root cause detection server 102 dynamically, for example during block 306, below, when the system component call logs are loaded. If not already residing in memory 210, the system component list is generally placed into memory 210 for further use. In some embodiments, a call log is not used. For example, a dependency map created by another system or process can be loaded. The dependency map can be used by subsequent blocks of the dependency mapper 300 to further define the relationships between system components 106 and to rank the importance of the relationships.

The dependency mapper 300 then proceeds to block 306, where the dependency mapping module 120 loads a call log for a system component 106 currently being mapped on the system component list. The call log can be a file residing on the same computing device as the system component 106 currently being mapped, a series of records in a data store 108, a section of memory 210, and the like. In some embodiments, the system component 106 itself can be consulted in order to obtain the call log. Generally, a call log can contain a set of records detailing individual actions taken by the system component 106 currently being mapped, including each other system component 106 that is called, each other system component 106 that is passed data, etc. In some embodiments a call log is not used, or is not the only source consulted, when determining which system components 106 may depend on the system component 106 currently being mapped. For example, a listing of the system components 106 that have experienced errors close in time to errors experienced by the system component 106 currently being mapped can be used. The listing can be compiled automatically by a separate monitoring system or manually by a system administrator. Alternatively, the listing can be created with input from a feedback loop, wherein the output of the root cause ranker 400, described below, is also used as input into the dependency mapper 300 to refine which system components 106 are most likely to produce root cause anomalies, and therefore which relationships between system components 106 are more important than might otherwise be determined using other methods. Machine learning algorithms can be employed as well.

The dependency mapper 300 then proceeds to block 308, where the dependency mapping module 120 determines the frequency of calls made to other system components 106. The frequency of calls can generally be determined by inspecting the call log loaded in block 306. The dependency mapping module 120 can simply sum the calls made to each other system component 106 over a certain time period, and maintain a list of each system component 106 with the corresponding number of times it is called by the system component 106 currently being mapped, the number of times it is passed data by the system component 106 currently being mapped, or the number of times it is otherwise operating under the effects of the system component 106 currently being mapped.

The dependency mapper 300 then proceeds to block 310, where the dependency mapping module 120 determines the latency of calls to the other system components 106. The call log loaded in block 306 can contain data regarding the latency of each call made to another system component 106. In some embodiments, the call log does not contain latency data, and the latency can be determined from alternate means, such as network logs, system logs, measurements stored in a data store 108, and the like. In some embodiments, factors other than latency can be considered. For example, the number of anomalies a system component has experience can be used. This data can be loaded from a data store 108, be input as the results of a feedback loop, etc. The type of system component 106 can also be considered.

The dependency mapper 300 then proceeds to block 312, where the dependency mapping module 120 defines the dependency relationships between the system component 106 currently being mapped and other system components 106. Generally, defining a dependency relationship can involve assigning a numerical value (or weight) to the dependency relationship to represent the importance of the dependency relationship, wherein the more substantially the actions of the system component 106a currently being mapped can affect or be affected by the actions of another system component 106, the more important the dependency relationship is. Important dependency relationships can be assigned higher values than less important dependency relationships. In some embodiments, less important dependency relationships can be assigned higher values. In some embodiments, non-numerical rankings can be assigned to the dependency relationships to represent the importance of each dependency relationship. The importance of each dependency relationship can be determined based on a number of different factors, including the frequency of calls to each other system component 106 as determined in block 308, and the latency of those calls as determined in block 310. Other factors can be considered as well. For example, if a system component 106 is implemented as a software module that is cached, it is typically an important and often-executed software module. Dependency relationships that involve a cached software module can be weighted more or less heavily because of the special troubleshooting issues they present and the potentially wide-ranging impact they can have on the system as a whole. In some embodiments, a codependent relationship can raise the importance of the dependency relationship. As described above, factors such as the number of anomalies experienced by the system component 106, or other attributes of the system component 106, can be considered when determining the importance of the dependency relationship.

The dependency mapper 300 then proceeds to block 314, where the dependency mapping module 120 stores the dependency definitions created in block 312. The dependency definitions can be stored in a data store 108, memory 210, a file on the hard drive of the root cause detection server 102, some other computing device, etc.

The dependency mapper 300 then proceeds to decision block 316, where the dependency mapping module 120 determines whether there are more system components 106 to map. The dependency mapping module 120 can refer to the system component list loaded in block 304 to make this determination. The dependency mapping module 120 can maintain a list of each system component 106 that it has mapped, or it can map the system components 106 in the order they are listed in the system component list, etc. If the dependency mapping module 120 determines that there are more system components 106 to map, execution of the dependency mapper 300 returns to block 306. If the dependency mapping module 120 determines that all system components 106 have been mapped, the dependency mapper 300 proceeds to block 318, where execution terminates.

It will be appreciated that certain blocks described above can be performed in a different order without affecting the objective or results achieved by the dependency mapper 300. For example, the block of determining the frequency of calls to other system components 106, described with respect to block 308, can alternatively be performed after the block of determining the latency of calls to other system components 106, described with respect to block 310. Alternatively, the two blocks can be combined and performed in a single block. Other modifications are possible to achieve the same results without departing from the scope of the present disclosure.

Figure 4:
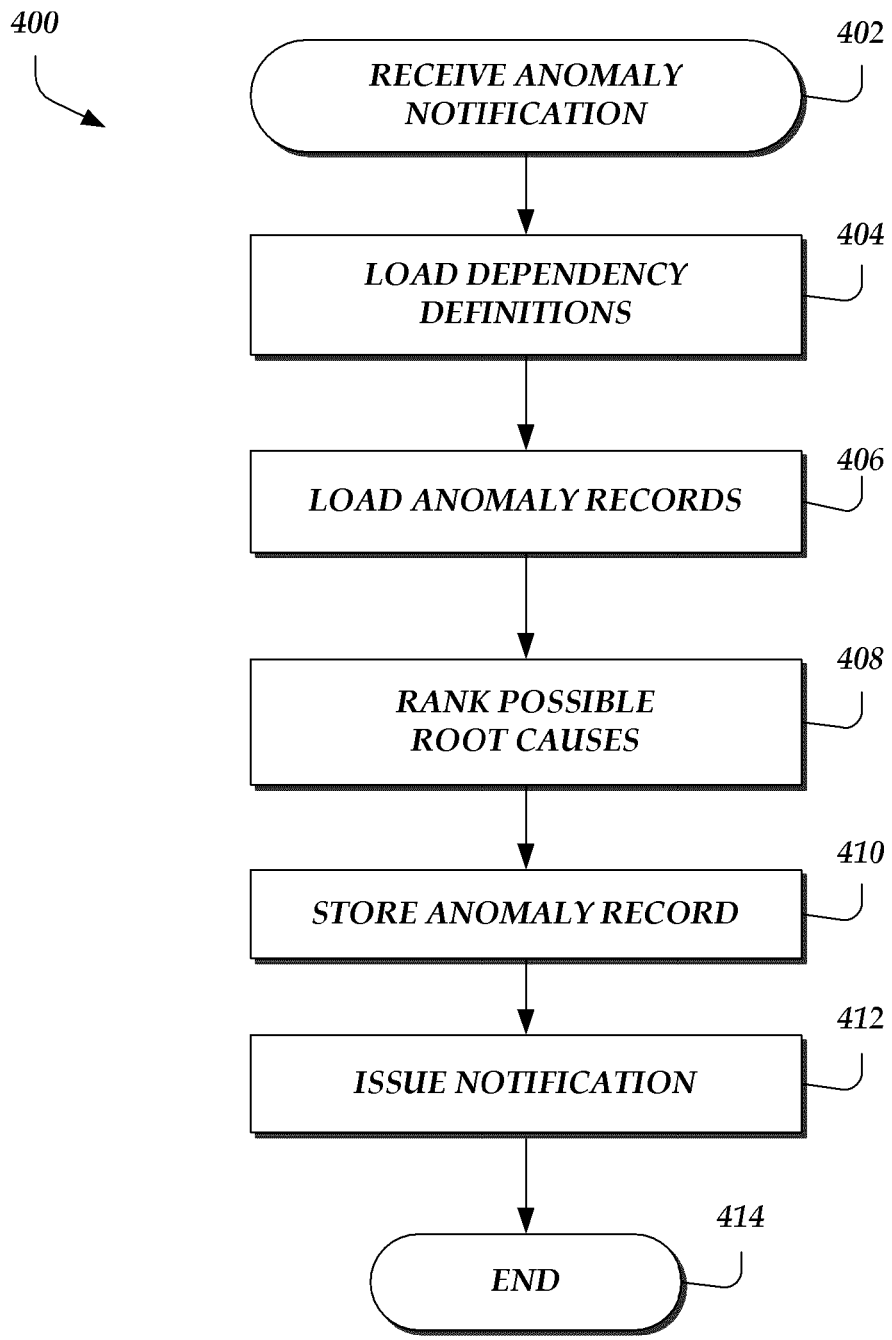
FIG. 4 is a flow diagram of an illustrative routine implemented by the root cause ranking module to determine the likelihood that anomalies experienced by system components are the root cause of an anomaly experienced by a monitored system component.

FIG. 4 is a flow diagram of an illustrative root cause ranker 400 implemented by the root cause ranking module 122 to determine which anomalies experienced by system components 106 are possible root causes of an anomaly in a monitored system component 106. The root cause ranker 400 of FIG. 4 can also rank the possible root cause anomalies experienced by system components 106 by the likelihood that each anomaly is an actual root cause of the anomaly experienced by the monitored system component 106. One skilled in the relevant art will appreciate that the root cause ranker 400 may be implemented by one or many computing devices or components that are associated with the root cause ranking module 122. The root cause ranker 400 is described with respect to determining the likelihood that a possible root cause anomaly experienced by a another system component 106 is an actual root cause of the anomaly experienced by the monitored system component 106 based on the magnitude of the possible root cause anomaly and the importance of the dependency relationship between the other system component 106 and the monitored system component 106. However, the root cause ranker 400 can be implemented differently without departing from scope of the disclosure, and thus the following illustrative embodiments and examples should not be construed as limiting.

The root cause ranker 400 can be useful in determining the likelihood that possible root cause anomalies experienced by system components 106 are actual root causes of an anomaly experienced by a monitored system component 106. Returning to the example of a multi-component system that builds and delivers a user interface over a network, such as a web site, a first system component 106a may receive a request to view a resource, such as a web page. The first system component 106a can perform preprocessing actions to the request before passing the request to a second system component 106b which creates the user interface. In such a system, an anomaly experienced by the first system component 106a may have a direct effect on the execution of the second system component 106b, because the first system component 106a preprocesses request data that the second system component 106b uses, and therefore an anomaly that interferes with the preprocessing of that request data by the first system component 106a can interfere with the proper execution of the second system component 106b. However, a different anomaly experienced by the first system component 106a, such as an anomaly unrelated to the preprocessing of the request, may not affect the second system component 106b and is therefore an unlikely root cause for an anomaly experienced by the second system component 106b. For example, if the first system component's 106a CPU utilization is measured to be 75% and the predicted value for that date and time is only 50%, the first system component 106a may be experiencing an anomaly. However, CPU utilization likely would not affect the operation of the second system component 106b, so long as the request data passed to the second component 106b is processed correctly and the first system component 106a stops executing before the second system component 106b begins execution. Accordingly, in some embodiments, the root cause ranker 122 can be configured to weigh such considerations when it ranks the possible root cause anomalies in order to determine the most likely root cause of an anomaly experienced by the monitored system component 106.

In operation, the root cause ranker 400 illustrated in FIG. 4 begins at block 402 when it receives an anomaly notification regarding a monitored system component 106. The root cause ranker 400 can be initiated when a monitored system component 106 has experienced, is currently experiencing, or is about to experience an anomaly. When this occurs, the root cause detection server 102 can initiate execution of the root cause ranking module 122. The notification can include data about the anomaly, including a data value representing an anomalous measurement of an operating parameter of the monitored system component 106, and a timestamp representing the time that the measurement was recorded. For example, a monitored system component 106 that has processed no sales in the last hour can indicate that some other system component 106 is experiencing an anomaly preventing new sales. An anomaly notification with a data value of zero sales over the course of an hour can trigger execution of the root cause ranker 400.

The root cause ranker 400 then proceeds to block 404, where the root cause ranking module 122 loads the dependency definitions for the system component 106 experiencing an anomaly—the monitored system component 106. The dependency definitions loaded in block 404 can be the same dependency definitions that were created as described above with respect to the dependency mapper 300 of FIG. 3. The dependency definitions can be loaded from a data store 108, memory 210, received from a web service, etc. If not already residing in memory 210, the dependency definitions are typically placed into memory 210 for further use.

The root cause ranker 400 then proceeds to block 406, where the root cause ranking module 122 loads anomaly records which represent anomalies experienced by system components 106 upon which the monitored system component 106 depends. The anomaly records may have been received as part of an anomaly notification during previous executions of the root cause ranker 400, and represent anomalies of the system components 106 with which the monitored system component 106 is in a dependency relationship, as defined by the dependency definitions loaded in block 404, above. The anomaly records loaded in block 406 are possible root causes for the anomaly experienced by the monitored system component 106. The anomaly records can be loaded from a data store 108, memory 210, received from a web service, etc. If not already residing in memory 210, the anomaly records are typically placed into memory 210 for further use.

The root cause ranker then proceeds to block 408, where the root cause ranking module 122 ranks the possible root causes. As described above with respect to block 406, the anomaly records represent anomalies which are the possible root causes of the anomaly experienced by the monitored system component 106. Generally, the possible root causes can be ranked in order of the likelihood that each is the actual root cause of the anomaly experienced by the monitored system component 106. Each possible root cause can be assigned a numerical value to represent the likelihood that it is the actual root cause, wherein the more substantially the anomaly experienced by the system component 106 can affect the actions of the monitored system component 106, the more likely it is the actual root cause. This likelihood can be determined based on a number of different factors, including the magnitude of each anomaly, as measured by how far the measurement of the operating parameter is from the expected range, a correlation between the operating parameter of the possible root cause and the anomaly of the monitored system component 106, etc. For example, a CPU utilization of 20%, when the expected value is 15%, may not indicate a strong likelihood that the anomalous CPU utilization is an actual root cause of an anomaly in a monitored component 106, whereas a CPU utilization of 99% would indicate a stronger likelihood that the anomalous reading is an actual root cause. In some embodiments, the ranking can be further adjusted by the system administrator or other users through various override mechanisms. In some embodiments, the ranking is determined or adjusted by a machine learning component of the root cause detection server 102.

The root cause ranker 400 then proceeds to block 410, where the root cause ranking module 122 stores the anomaly record received with the anomaly notification in block 402. The anomaly record can be stored in a data store 108, memory 210, a file on the hard drive of the root cause detection server 102 or some other computing device, and the like. The anomaly record can then be used during a subsequent execution of the root cause ranker 400 when the monitored system component 106 is in a dependency relationship with the system component 106 taking on the role of monitored system component 106 in the subsequent execution.

The root cause ranker 400 then proceeds to block 412, where the root cause ranking module 122 can issue a notification including a ranked list of possible root causes. The notification can be an email, a data transfer to a support ticketing system, etc. In some embodiments, the notification can be a combination of a notification to a system administrator with a message sent to a troubleshooting user interface, as described in detail below. In some embodiments, the method of notification can be dependent upon the type of anomaly detected, the system components 106 experiencing a possible root cause anomaly, and the like. The root cause ranker 400 then proceeds to block 414, where execution terminates.

It will be appreciated certain actions described above can be performed in a different order without affecting the objective or results achieved by the root cause ranker 400. For example, storing the anomaly data received in block 402, described with respect to block 410, can alternatively be performed before issuing a notification, described with respect to block 412. Alternatively, the two actions can be combined and performed at the same time. Other modifications are possible to achieve the same results without departing from the scope of the present disclosure.

When a user, such as a system administrator, desires to utilize the root cause detection server 102 to map the relationships between system components 106 and determine which possible root cause anomalies are most likely to be the root cause of an anomaly in a monitored system component 106, basic profile information for the system components 106 may be entered into a data store 108. The basic profile information can include which operating parameters to consider when determining whether anomalies are possible root causes, the notification method to invoke when an anomaly is identified as a likely root cause, and the like. Once the dependency relationships between the system components 106 are defined and stored, they can be updated on demand by the system administrator, updated on a schedule set by system administrator, updated whenever a system component 106 is added, modified, or removed, etc. Such changes in the system components 106 can also trigger updates to the various operating parameters which are weighted to determine which anomalies may be the actual root cause of anomalies in a monitored system component 106.

In some embodiments, the root cause detection server 102 can automatically discover the system components 106 that make up the system and the dependency relationships between them. The automatic discovery can involve inspection of system logs, querying a data store 108, observation of the call stack, and the like. In some embodiments, the root cause detection server 102 can automatically discover which operating parameters, when anomalous, are the most likely to be the actual root causes of anomalies in related system components 106. Like the discovery of the system components 106 and their dependency relationships, discovery of the particular operating parameters to consider when determining the root cause of anomalies in monitored system components 106 can involve inspection of system logs, querying a data store 108, observation of the call stack, and the like.

When a monitored system component 106 experiences an anomaly, a notification can be issued to the root cause detection server 102. As described above, the notification can be issued by the monitored system component 106 itself, by a separate system tasked with monitoring the system components 106 for anomalies, or by a separate module of the root cause detection server 102 itself. When the root cause detection server receives the notification, it can execute the instructions of the root cause ranking module 122 to determine a list of the most likely root causes for the anomaly in the monitored system component 106. A root cause is typically an anomaly experienced by a system component 106 that is in a relationship with the monitored system component 106. As described above, the root cause ranking module 122 can then issue a notification that can include information about the anomaly that the monitored system component 106 is experiencing and a ranked listing of the most likely root causes for the anomaly.

Figure 5:
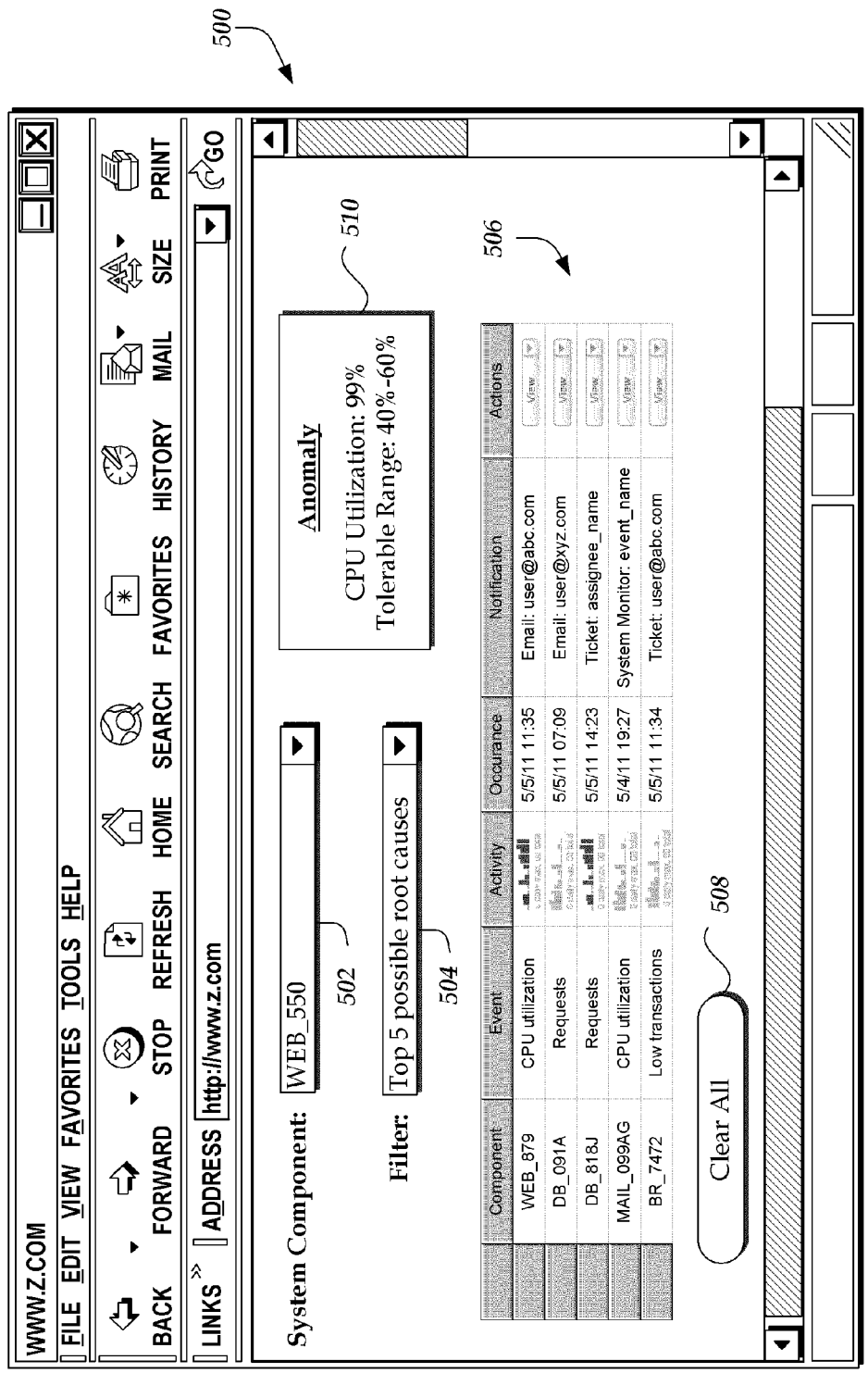
FIG. 5 is an illustrative user interface generated by the user interface module that presents information about the operation of the root cause detection server, its mapping of the dependency relationships between system components, and its ranking of possible root causes for anomalies experienced by monitored system components.

FIG. 5 is an illustrative user interface 500 generated by the root cause detection server 102 for presenting the likely root causes of an anomaly experienced by a monitored system component 106 and for enabling actions to a system administrator to address the root causes. The user interface 500 includes a system component selection field 502, a filter field 504, a data grid 506, a clear all control 508, and an anomaly information area 510. The system component selection field 502 can be a drop-down field, with a list of system components 106. The filter field 504 can be a drop-down field, with a list of filters that assist in narrowing the list of possible root causes. The data grid 506 can be an interactive grid that displays data records and provides actions to take with respect to those records. The clear all control 508 can be an action button that removes all records displayed on the data grid 506. The anomaly information area 510 can be a label that provides information about the most recent anomaly associated with the system component 106 selected in the system component selection field 502.

In operation, when a system administrator gets a notification of an anomaly, the system administrator can view further information about the situation and take actions through the user interface 500 of the root cause detection server 102. The root cause detection server 102 can execute the instructions of the user interface module 124 to generate the user interface 500 for display. The data grid 506 can display data associated with the system component 106 selected in the system component selection field 502. The data displayed in the data grid 506 can be further limited or filtered by selecting options in the filter field 504, such as the top 5 root cause events, all possible root cause events, etc. One or more columns of the data grid 506 can provide action buttons or links that initiate particular functions when activated. For example, when the "view" button in the data grid 506 illustrated in FIG. 5 is clicked, the system administrator can be redirected to a separate user interface (not shown) which allows the user to view more detailed information about the possible root cause anomaly described in that particular record of the data grid 506. Other options can include override functions, which can assist in tuning the performance of the root cause ranker 400 as described in detail above. Those skilled in the art will appreciate the user interface 500 may have fewer, more, or different elements than those described above, and may have a different look and feel than that illustrated in FIG. 5 without departing from the scope of the present disclosure.

The user interface 500 as described above can be generated as a web page sent to an administrator computing device 110 as a file or data stream to be rendered by a browser program resident on the administrator computing device 110. It will be appreciated that the user interface 500 can be implemented in other ways, including a client-server configuration with a thick client resident on the administrator computing device 110, a text-based or command line system like those found in mainframe systems, a web service or other remote program with an exposed API for programmatic operation, and the like.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase 'at least one of X, Y and Z,'" unless specifically stated otherwise, is to be understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code, which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for detecting a possible root cause of an anomaly detected in a monitored system component, the system comprising:
    a data store configured to store:
        one or more anomaly records, wherein each anomaly record is associated with a system component in which an anomaly has been detected; and
        one or more dependency definitions, wherein a dependency definition represents a relationship between at least two system components; and
    a computing device in communication with the data store, the computing device configured to:
        generate the one or more dependency definitions stored in the data store;
        receive a notification of an anomaly detected in a monitored system component;
        identify, based on a dependency definition representing a relationship between the monitored system component and at least one other system component, a system component that is related to the monitored system component;
        retrieve from the data store at least one anomaly record that is associated with the identified system component; and
        issue a notification indicating that the anomaly represented by the at least one anomaly record retrieved from the data store is a possible root cause for the anomaly detected in the monitored system component.

2. The system of claim 1, wherein each anomaly record comprises a data value and a timestamp, wherein the data value represents a measurement of an operating property of a system component in which an anomaly has been detected, and wherein the timestamp represents a time at which the measurement is recorded.

3. The system of claim 2, wherein a plurality of anomaly records are retrieved from the data store.

4. The system of claim 3, wherein the plurality of anomaly records retrieved from the data store are ranked to determine the most likely root cause of the anomaly detected in the monitored component, and wherein the ranking depends at least in part on the data values of the plurality of anomaly records.

5. The system of claim 3, wherein the plurality of anomaly records retrieved from the data store are ranked to determine the most likely root cause of the anomaly detected in the monitored component, and wherein the ranking depends at least in part on the timestamps of the plurality anomaly records.

6. The system of claim 3, wherein the computing device is further configured to generate for display a user interface that presents at least one of the plurality of anomaly records.

7. A computer-implemented method for detecting a possible root cause of an anomaly detected in a monitored component, the method comprising:
    as implemented by one or more computing devices configured with specific executable instructions,
        receiving a notification of an anomaly detected in a monitored component;
        identifying, based on a dependency definition representing a relationship between the monitored component and at least one other system component, a system component that is related to the monitored component;
        retrieving an anomaly record associated with the identified system component, wherein the anomaly record represents an anomaly of the identified system component; and
        issuing an electronic notification, wherein the notification indicates that the anomaly represented by the retrieved anomaly record retrieved is a possible root cause for the anomaly detected in the monitored component.

8. The computer-implemented method of claim 7, wherein the anomaly record comprises a timestamp and a data value, and wherein the data value represents a measurement of an operating property of the system component at a time represented by the time stamp.

9. The computer-implemented method of claim 8, wherein a plurality of anomaly records are retrieved from the data store.

10. The computer-implemented method of claim 9, further comprising ranking the anomaly records based at least in part on the data value of each of the anomaly records.

11. The computer-implemented method of claim 9, further comprising ranking the anomaly records based at least in part on the timestamp of each of the anomaly records.

12. The computer-implemented method of claim 9, further comprising ranking the anomaly records based at least in part on a property of the monitored component.

13. The computer-implemented method of claim 9, further comprising ranking the anomaly records based at least in part on a property of the system component.

14. A computer-implemented method for recording a relationship between a plurality of system components, the method comprising:

as implemented by one or more computing devices configured with specific executable instructions, determining a relationship between a first system component and a second system component based at least in part on input received from a feedback loop, wherein an anomaly experienced by the first component is a possible root cause of an anomaly experienced by the second system component;

creating dependency data in computer memory, said dependency data representing the relationship; and storing the dependency data in a data store.

15. The computer-implemented method of claim 14, wherein the relationship comprises the first system component initiating communication with the second system component.

16. The computer-implemented method of claim 14, wherein the relationship comprises the first system component processing the same data as the second system component.

17. The computer-implemented method of claim 14, wherein the relationship comprises the first system component creating data that is used by the second system component.

18. The computer-implemented method of claim 14, wherein the relationship comprises the first system component and the second system component having each experienced anomalies within a predetermined period of time.

19. The computer-implemented method of claim 14, wherein determining the relationship is based at least in part on input created by a machine learning component.

20. A computer-readable, non-transitory storage medium having computer-executable components for detecting a possible root cause of an anomaly detected in a monitored system component, the computer-executable components comprising:

a first module that determines possible root causes of an anomaly detected in a monitored system component, wherein the determining comprises:

identifying, based on a relationship between the monitored component and at least one other system component, a system component that is related to the monitored component; and retrieving from a data store an anomaly record associated with the identified system component, wherein the anomaly record represents an anomaly of the identified system component; and a second module that issues an electronic notification, wherein the notification indicates that the anomaly represented by the anomaly record retrieved from the data store is a possible root cause for the anomaly detected in the monitored component.

21. The computer-readable, non-transitory storage medium of claim 20, wherein the first module further receives a notification of the anomaly detected in the monitored system component.

22. The computer-readable, non-transitory storage medium of claim 20, wherein the relationship is represented by a dependency definition loaded from the data store.

23. The computer-readable, non-transitory storage medium of claim 20, wherein the anomaly record comprises a data value and a timestamp, and wherein the data value represents a measurement of an operating parameter at a time represented by the timestamp.

24. The computer-readable, non-transitory storage medium of claim 23, wherein a plurality of anomaly records are retrieved from the data store.

25. The computer-readable, non-transitory storage medium of claim 24, wherein the first module further ranks the plurality of anomaly records to determine the most likely root cause of the anomaly detected in the monitored component, wherein the most likely root cause is an anomaly represented by an anomaly record, and wherein the ranking is based at least in part on the data value of each of the anomaly records.

26. The computer-readable, non-transitory storage medium of claim 24, wherein the first module further ranks the plurality of anomaly records to determine the most likely root cause of the anomaly detected in the monitored component, wherein the most likely root cause is an anomaly represented by an anomaly record, and wherein the ranking is based at least in part on the relationship between the monitored component and the system component associated with the anomaly record.

27. The computer-readable, non-transitory storage medium of claim 20, further comprising a third module that determines a relationship between a first system component and a second system component, wherein the determining comprises:

creating dependency data representing the relationship; and storing the dependency data in the data store.

28. The computer-readable, non-transitory storage medium of claim 20, further comprising a fourth module that generates a user interface that presents information associated with the possible root cause of the anomaly detected in the monitored component.

* * * * *